United States Patent
Martens et al.

[15] 3,657,631
[45] Apr. 18, 1972

[54] CONVERTER CIRCUITS

[72] Inventors: Jean Victor Martens, Deurne-Antwerp; Marcel Clement Rene Natens; Amanuel De Aguirre, both of Antwerp, all of Belgium

[73] Assignee: International Standard Electric Corporation, New York, N.Y.

[22] Filed: Nov. 25, 1970

[21] Appl. No.: 92,718

[30] Foreign Application Priority Data

Dec. 19, 1969 Netherlands..........................6919147

[52] U.S. Cl................................321/2, 321/11, 321/14, 321/18, 321/45 R
[51] Int. Cl................................................H02m 3/32
[58] Field of Search.............321/2, 11, 12, 18, 19, 45 R, 321/14; 331/113 A

[56] References Cited

UNITED STATES PATENTS

| | | | |
|---|---|---|---|
| 3,490,028 | 1/1970 | Modiano.................... | 321/2 |
| 3,439,251 | 4/1969 | Schaefer.................... | 321/2 X |
| 3,490,027 | 1/1970 | Galetto et al............. | 321/2 |

FOREIGN PATENTS OR APPLICATIONS

| | | | |
|---|---|---|---|
| 394,372 | 11/1965 | Switzerland............. | 321/18 |
| 76,701 | 10/1961 | France..................... | 321/2 |

*Primary Examiner*—William H. Beha, Jr.
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

This invention relates to a chopper circuit for converting the voltage from an input DC source into an alternative output voltage. The ends of the primary winding of the output transformer are coupled to one pole of said DC source via first and second switching devices. The other pole of the DC source is coupled to a mid-tapping of the primary winding. A control signal generator provides first and second phase pulse sequences which are fed to said first and second devices to alternately switch them ON and OFF. To eliminate DC magnetizing current the pulse widths of the first and second pulse sequence so that the current pulse widths at the output of the power transistors are maintained substantially equal.

2 Claims, 2 Drawing Figures

3,657,631

CONVERTER CIRCUITS

BACKGROUND OF THE INVENTION

The present invention relates to a chopper circuit for converting the voltage from an input DC source into an alternative output voltage, including an output transformer with at least one primary winding whose ends are coupled to one pole of said DC source via first and second switching devices respectively, the other pole of said DC source being coupled to a mid-tapping of said primary winding, control signal generating means providing first and second phase pulse sequences, and coupling means to respectively apply said first and said second phase pulse sequences to said first and said second device to alternately switch them ON and OFF one at a time.

Such a chopper circuit is described in US Pat. No. 3,145,334.

This known chopper circuit is however unsuitable for operation at relatively high frequencies, e.g., of the order of 20 kHz. For the latter frequencies the DC component in the output wave of the chopper is no longer negligible and will saturate the output transformer, if no special precautions are taken. This unbalance in the chopper output wave is mainly due to unequal storage items of the power transistor, which generally constitute the above first and second switching devices, and to a lesser extent to unequal storage times of the transistors generally used for the driving stages thereof. Thus, even if the actuating control pulses of the power transistors are perfectly equal to one another, it will generally not be the same with the length of their output current pulses.

The resulting DC magnetizing current, which in fact adds to one power transistor and subtracts from the other will cause the destruction of the former power transistor upon the corresponding primary half of the output transformer being saturated, since at that moment, this power transistor will be short-circuited across the input DC source and consequently its dissipation will exceed the admissible limits.

SUMMARY OF THE INVENTION

It is an object of the present invention to provide a chopper circuit of the above type which does not present the above mentioned drawback.

According to a broad aspect of the invention there is provided an improved chopper circuit for converting the voltage from an input DC source into an alternating output voltage, including an output transformer with at least one primary winding whose ends are coupled to one pole of said DC source via first and second switching devices respectively, the other pole of said DC source being coupled to a mid-tapping of said primary winding, control signal generating means providing first and second phase pulse sequences and coupling means to respectively apply said first and said second phase pulse sequences to said first and said second switching devices to alternately switch them ON and OFF one at a time, wherein the improvement comprises first and second transducing means to transduce the current pulse widths through said first and said second devices into first an second signals respectively, comparison means to compare the amplitude of said first signals with the amplitude of said second signals and provide in response thereto an output signal proportional to the difference of the two signals, and means to apply said output signal to said control signal generating means to modify the pulse widths of said first and second pulse sequences so that the current pulse widths through said first and said second switching devices are maintained substantially equal to one another.

According to another aspect of the invention, there is provided a regulated DC to DC converter comprising an unregulated DC source, a regulated DC chopper circuit fed from said DC source, means to rectify and filter the output from said chopper, means to derive a comparison voltage proportional to the output voltage, and means to compare said comparison voltage with a reference voltage and apply the resulting error voltage to control pulse generating means which control the ON to OFF ratio of said chopper.

The above mentioned and other objects and features of the invention will become more apparent and the invention itself will be best understood by referring to the following description of an embodiment taken in conjunction with the accompanying drawing in which:

DESCRIPTION OF THE PREFERRED EMBODIMENT

Figure 1:
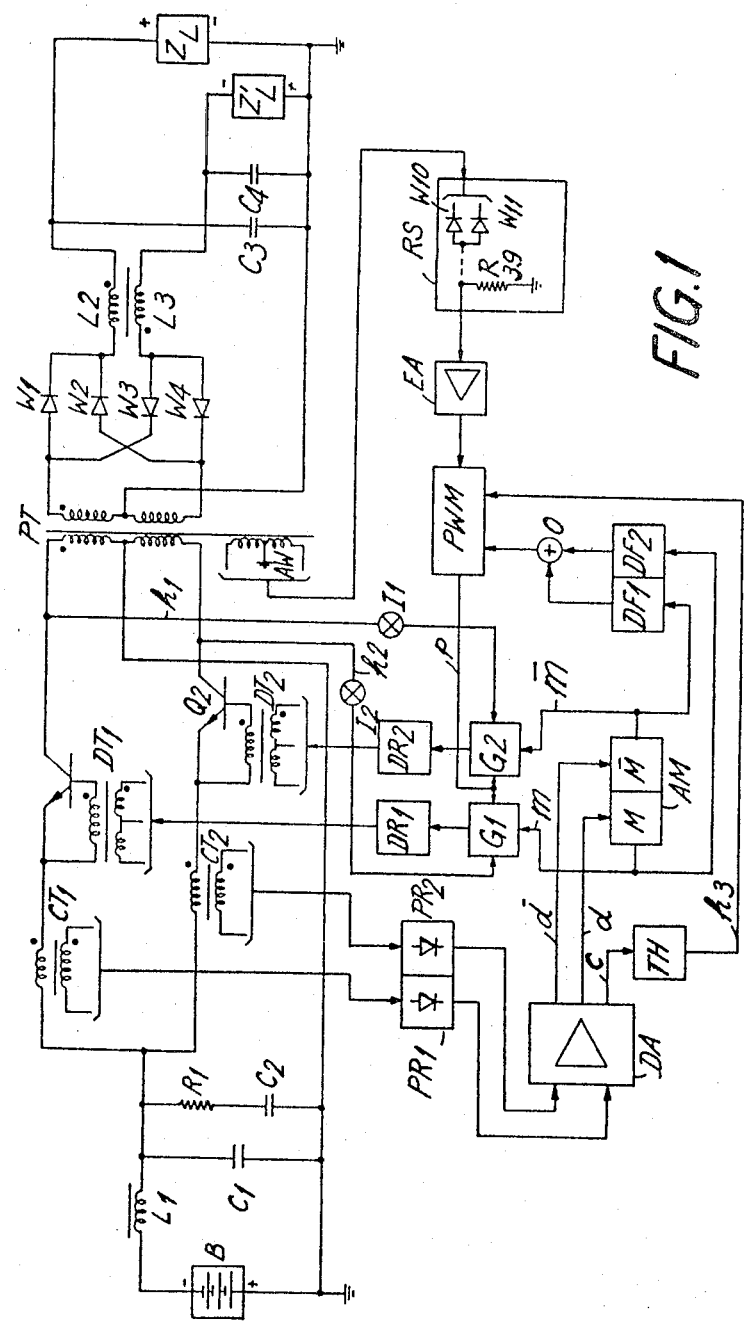
FIG. 1 shows a regulated DC to DC converter in accordance with the invention.

Referring to FIG. 1, the regulated DC to DC converter shown therein is constituted by the cascaded arrangement of an unregulated DC source B, e.g., a battery of 48 Volts ± 15 percent, an inductance/ capacitance input low pass filter L1/C1, a controlled DC chopper including two switching power transistors Q1 and Q2 and their associated control circuits, and an AC to DC converter constituted by a rectifier bridge using the four diodes W1 to W4 and associated thereto inductance/capacitance output low pass filters L2/C3 and L3/C4. The positive pole of DC source B is connected to ground, whereas the negative pole thereof is connected via the smoothing inductor L1, on the one hand to one end of the respective primary windings of two identical current transformers CT1 and CT2, and on the other hand to ground via the capacitors C1 in parallel with the series connection of a resistor R1 and a capacitor C2. The other ends of the primary windings of transformers CT1 and CT2 are respectively connected the emitter electrodes of two NPN power transistors Q1 and Q2, whose collector electrodes are connected to the respective ends of the primary winding of a power transformer PT. The primary winding thereof has a center-tapping connected to ground. The base electrodes of transistors Q1 and Q2 are connected to their emitter electrodes via the secondary windings of two identical driving transformers DT1 and DT2 respectively. The secondary winding of power transformer PT has its ends connected to two corresponding inputs of a double phase rectifier bridge comprising the diodes W1 to W4 and has a center tapping connected to ground. The positive and negative outputs of rectifier bridge W1 to W4 are respectively connected to one end of the windings L2 and L3 of a same inductor. The latter windings L2 and L3, which have equal inductances, are wound in opposite senses with respect to one another, as indicated by the respective black dots. The other end of winding L2 (L3) is connected to ground via the parallel connection of a capacitor C3 (C4) and a load impedance ZL (Z'L). In this way, a positive and a negative regulated voltage, e.g., of 27 Volts and −27 Volts are applied across the load impedances ZL and Z'L respectively.

The control circuitry of the above DC to DC converter includes three feedback loops.

The first feedback loop comprises the current transformers CT1 and CT2 whose secondary windings respectively feed two identical peak rectifier circuits PR1 and PR2. The outputs of the latter circuits PR1 and PR2 are connected to two corresponding inputs of a differential amplifier DA. The differential outputs $d$ and $\bar{d}$ of amplifier DA are connected to two respective control inputs of a free running multivibrator AM comprising two alternately conducting active stages, referred to as M and $\overline{M}$. The complementary outputs $m$ and $\overline{m}$ of multivibrator AM are connected to the first input of two 3-input NAND (not-AND) gating circuits G1 and G2 respectively. The outputs of NAND gates G1 and G2 are connected through two driver stages DR1 and DR2 to the primary windings of driving transformers DT1 and DT2 respectively.

The second feedback loop comprises two phase inverters I1 and I2 having their inputs connected to the collectors of transistors Q1 and Q2 via the conductors $h1$ and $h2$ and their outputs connected to the second inputs of NAND gates G2 and G1, respectively.

The third feedback loop comprises an auxiliary winding AW on the power transformer PT which is fed from the secondary winding thereof. This auxiliary winding AW, which has a center tapping connected to ground, feeds in its turn through its outer ends a rectifying smoothing circuit RS. Circuit RS is conventional and may for instance be constituted by two negative wave rectifiers W10W11 having their cathodes connected to the respective ends of auxiliary winding AW, the commoned anodes thereof feeding an output grounded resistor R39 via a smoothing filter section (not shown). The live end of resistor R39, constituting the output of circuit RS, is connected to the input of an error amplifier EA. The output of the latter amplifier EA is connected to the pulse width control input of a pulse width modulator PWM. The output p of modulator PWM is connected in common to the third inputs of the NAND gating circuits G1 and G2. The triggering input of pulse width modulator PWM is connected to the output of a 2-input OR gate 0 whose inputs are connected to the outputs $m$ and $\overline{m}$ of multivibrator AM via two differentiators DF1 and DF2 respectively.

The control circuitry of the DC to DC converter still incorporates an overcurrent protection arrangement comprising a threshold circuit TH having its input connected to the common mode output $c$ of the differential amplifier DA and its output connected to an inhibiting input of the pulse width modulator PWM via a conductor $h3$.

Figure 2:
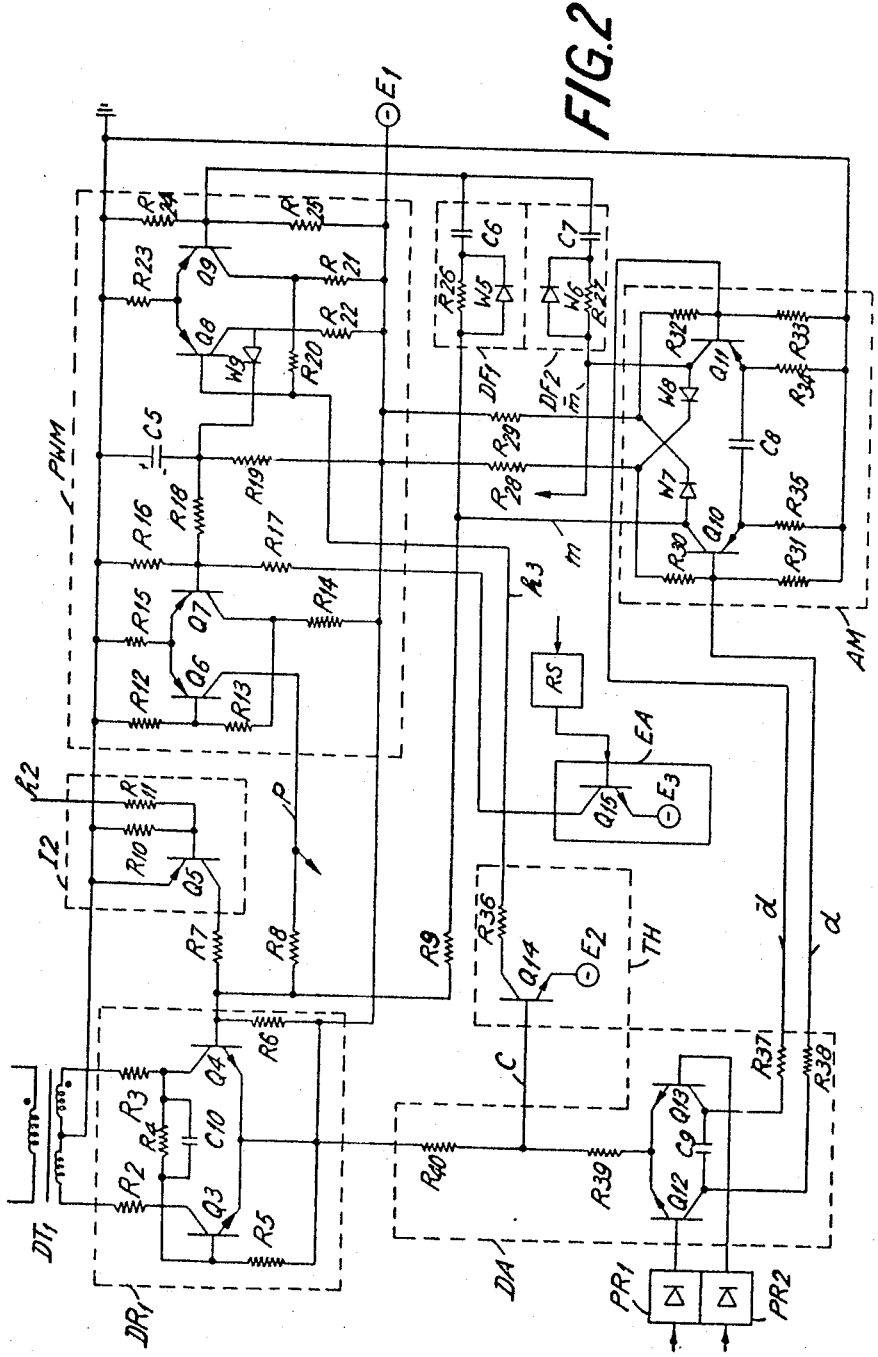
FIG. 2 represents in detail part of the circuitry of the converter of FIG. 1.

FIG. 2 shows in detail part of the circuitry of the regulated DC to DC converter, which has been represented by functional blocks in FIG. 1. The differential amplifier DA comprises two NPN transistors Q12 and Q13 having their emitters connected to one another, with the junction point thereof being connected to a source E1 of stabilized negative DC potential via the series connection of resistors R39 and R40. The bases of transistors Q12 and Q13, which constitute the aforementioned differential inputs of amplifier DA, are respectively connected to the outputs of the peak rectifiers PR1 and PR2. The collectors of transistors Q12 and Q13 are connected, on the one hand to one another via a capacitor C9, and on the other hand through resistors R38 and R37 to the bases of two PNP transistors Q10 and Q11, constituting the two active stages M and $\overline{M}$ (FIG. 1) of the astable multivibrator AM respectively. The base of transistors Q10 (Q11) is also connected to ground via a resistor R31 (R33) and to the junction point of the cathode of a diode W8 (W7) and a resistor R28 (R29) via a resistor R30 (R32). The anode of diode W8 (W7) and the other end of resistor R28 (R29) are connected to the collector of transistor Q11 (Q10) and to the source E1, respectively. The emitters of transistors Q10 and Q11 are connected, on the one hand to one another via a capacitor C8 and on the other hand to ground via respective resistors R35 and R34. The multivibrator AM normally providing a balanced square wave output, the homologue elements of stages M and $\overline{M}$ thereof have identical values, i.e., R30 = R32; R31 = R33; R35 = R34; R29 = R28. The collector of transistor Q10 (Q11), which forms the aforementioned output $m$ ($\overline{m}$) of multivibrator AM, is connected to the triggering input of pulse width modulator PWM via the differentiator DF1 (DF2) comprising the parallel connection of a diode W5 (W6) and a resistor R26 (R27), e.g., R26 = R27 = 27 KOhms, in series with a capacitor C6 (C7). These differentiators DF1 and DF2 differentiate the positive going transitions of the square waves appearing in phase opposition on the multivibrator outputs $m$ and $\overline{m}$ respectively. The above triggering input of pulse width modulator PWM is constituted by the base of transistor Q9 of a bistate circuit comprising two PNP transistors Q9 and Q8. The base of transistor Q9 is further connected to ground via a resistor R24 (1,500 0hms) and to the source E1 via a resistor R25 (1,5000 Ohms). The collectors of transistors Q9 and Q8 are also connected to the source E1 via respective resistors R21 and R22 (R21 = R22 = 3,300 Ohms), whereas the emitters thereof are connected to ground via a common resistor R23 (33 0hms). The base of transistor Q8 is connected, on the one hand to the junction of resistor R21 and collector of transistor Q9 via a resistor R20 (1,000 0hms) and on the other hand to the collector of an NPN transistor Q14 via a resistor R36 (220 0hms). The latter transistor Q14 constitutes the threshold circuit TH. It has its emitter connected to a reference source of negative potential E2 and its base connected to the common mode output $c$ of differential amplifier DA, taken from the junction point of resistors R39 and R40 thereof. The collector of transistors Q8 is further connected to the base of transistor Q7 of a monostable circuit comprising two PNP transistors Q6 and Q7, via the series connection of a decoupling diode W9 and a resistor R18. The junction of the cathode of diode W9 with resistor R18 is connected, on the one hand to ground via a capacitor C5 and on the other hand to the source E1 via a resistor R19. The junction of the base of transistor Q7 with resistor R18 is connected to ground via a resistor R16 and to the collector of an NPN transistor Q15 via a resistor R17. Transistor Q15, which constitutes the error amplifier EA, has its emitter connected to a reference source of negative potential E3 and its base connected to the output of the rectifying smoothing circuit RS. The collector of transistor Q7 is connected, on the one hand to source E1 via a resistor R14 and on the other hand to ground via the series connection of a resistor R13 and a resistor R12, the junction of the latter two resistors being connected to the base of transistor Q6. The emitters of transistors Q6 and Q7 are connected to ground via a common resistor R15. The collector of transistor Q6, which constitutes the output p of pulse width modulator PWM, is connected via a resistor R8 to the base of transistor Q4 of a bistate circuit comprising two PNP transistors Q3 and Q4.

These transistors Q3 and Q4 constituting the driver stage DR1, have their collectors connected to the ends of the primary winding of driving transformer DT1 via resistors R2 and R3 respectively. The latter primary winding has a center-tapping connected to ground. The collector of transistor Q4 is further connected to the source E1 via a resistor R4 in parallel with a capacitor C10 and in series with a resistor R5, the junction of resistors R4 and R5 being connected to the base of transistor Q3. The emitters of transistors Q3 and Q4 are connected directly to the source E1. The base of transistor Q4 is still connected to the collector of a PNP transistor Q5 via a resistor R7. This transistor Q5, which constitutes the phase inverter I2, has its emitter connected to ground and its base connected to the junction of two resistors R10 and R11. The other ends of resistors R10 and R11 are connected to ground and to the aforementioned conductor h2 respectively. As it can readily be seen, the NAND gating circuit G1 of FIG. 1 is formed by the resistors R7, R8, R9 and R6 and the transistor Q4 of bistate circuit Q3/Q4 (negative signals are defined as "1"). In a similar way, the output p of pulse width modulator PWM, the output $\overline{m}$ of multivibrator AM and the output of inverter I1 (not shown in FIG. 2) are connected to the driver stage DR2 (not shown in FIG. 2) via respective resistors R'8, R'9 and R'7 (not shown; R8 = R'8, R9 = R'9, R7 = R'7). The circuitries of inverter I1 and driver DR2 being similar to these of inverter I2 and driver DR1 described in detail hereabove, have not further been shown in FIG. 2, in order to simplify the drawing.

The principle of operation of the above DC to DC converter will hereinafter be explained by referring to the circuits of FIGS. 1 and 2.

The unregulated voltage of source B is applied via the input filter L1/C1 and the damping arrangement R1/C2 to the chopper Q1/Q2. The power transistors Q1 and Q2, which are alternately switched ON and OFF, one at a time, by control pulses applied between their emitter and base electrodes via the driving transformers DT1 and DT2, provides, as it will later be explained, current pulses of equal length with respect to one another to the corresponding ends of the primary winding of power transformer PT. Hence, the AC voltage wave appearing across the secondary winding of transformer PT is balanced with respect to ground, i.e., the areas of the negative and positive half cycles thereof are equal. Diode bridge W1 to W4 rectifies the above AC voltage and the resulting positive and negative full-wave rectified voltages, taken at the junction of the cathodes of diodes W1 and W2 and the junction of the anodes of diodes W3 and W4, are applied to the load impedances ZL and Z'L through the smoothing filters L2/C3 and L3/C4, respectively. In this way, loads ZL and Z'L are fed with equal DC voltages of opposite sign. It is to be noted, that in practice individual DC stabilizers (not show) are further inserted between the smoothing filter L2/C3 and L3/C4 an the respective loads ZL and Z'L to provide highly accurate output DC voltages.

In connection with the smoothing circuits L2/C3 and L3/C4 it is to be remarked, that owing to the inductive coupling of windings L2 and L3, which pertain to a same inductor, an improved tracking of the positive and negative output voltages is performed. In particular, if one of the load impedances ZL and Z'L which are variable, becomes infinite, the other one having a value within a normal range, the transient voltage on the unloaded output does not rise beyond a relatively low value, since the latter output is still loaded through the inductive coupling of windings L2 and L3. In this way, diodes W1 and W4 need no longer be able to withstand large inverse voltages.

The equalization of the conduction times $t1$ and $t2$ of power switches Q1 and Q2 is performed by means of the aforementioned first feedback loop. The current pulses passing through switches Q1 and Q2 and primary windings of current transformers CT1 and CT2, induce corresponding duration voltages in the secondary windings thereof respectively. The latter voltages are peak rectified by the circuits PR1 and PR2 and the resulting voltages V1 and V2, which are proportional to the duration of the current pulses through switches Q1 and Q2, are applied to the corresponding inputs of differential amplifier DA, i.e., to the bases of transistors Q12 and Q13 respectively. If the current pulse widths $t1$ and $t2$ are equal to one another ($t1 = t2 = t$) the voltages V1 and V2 are equal too, and hence, this is true for the collector voltages of transistors Q12 and Q13. The base potentials of transistors Q10 and Q11 are also equal to one another and the multivibrator AM provides a balanced square wave output. If supposing that one of the pulse widths $t1$ and $t2$ becomes larger than the above normal pulse width t and the other one smaller, e.g., $t1>t>t2$, then voltage V1 becomes more positive than voltage V2, and the collector voltage of transistor Q12 becomes more negative than that of transistor Q13. The base bias potential of transistor Q10 becomes also more negative than that of transistor Q11, so that the multivibrator AM provides now an unbalanced square wave output, the conduction times of transistors Q10 and Q11, in the considered multivibrator period, being lengthened and shortened by the same amount respectively. It is to be noted, that transistors Q10 and Q11 of astable multivibrator AM are prevented from saturating by clamping diodes W7 and W8. Differentiators DF1 and DF2 differentiate the positive going transitions of the square waves appearing on outputs $m$ and $\overline{m}$ of multivibrator AM with 180° phase difference with respect to one another, whereby the frequency of the resulting train of positive going narrow pulses appearing at the output of OR-gate 0, i.e., at the junction of capacitors C6 and C7, is twice the frequency of astable multivibrator AM. The latter train of positive going pulses applied to the base of transistor Q9 of pulse width modulator PWM causes the triggering of bistate circuit Q8/Q9 thereof, at the same frequency. Indeed, transistor Q9 of bistate circuit is normally saturated and transistor Q8 thereof is cut-off, its base being at a near ground potential via resistor R23 (33 Ohms), saturated transistor Q9 and resistor R20 (1,000 Ohms). When a positive pulse is applied to the base of transistor Q9, bistate circuit Q8/Q9 reverses its state, as long as the positive pulse is lasting, and collector of saturated transistor Q8 is brought at a near ground potential, while collector of transistor Q9 is brought at the negative potential of source E1. Upon bistate circuit Q8/Q9 being triggered in its reverse state i.e., Q8 saturated and Q9 cut-off, diode W9 becomes conductive and capacitor C5 of monostable circuit Q6/Q7 is almost instantaneously discharged via the low resistance path: diode W9, saturated transistor W8 and resistor R23. Transistor Q7, which is normally conductive, is switched OFF, since its base now is brought at a more positive potential than the base bias potential of transistor Q6, thus transistor Q6 is switched in its conductive condition. When the short duration positive pulse applied to the base of transistor Q9 vanishes, bistate circuit Q8/Q9 switches back to its normal condition and diode W9 is again brought in its blocking condition and interrupts the discharge path of capacitor C5. The charge current of capacitor C5 starts flowing through resistors R16 and R18, so that monostable circuit Q6/Q7 switches back to its normal condition upon capacitor C5 being charged to a more negative potential than the base bias potential of transistor Q6. The above charge time of capacitor C5 depends on the amount of current diverted through resistor R17 by transistor Q15 of error amplifier EA. Transistor Q15 being operated in its linear characteristic region, the current it diverts is a linear function of the difference between the output negative voltage of rectifying smoothing circuit RS and the normally more negative voltage of reference source E3. In this way, the larger the e.m.f. induced in the auxiliary winding AW of power transformer PT by the secondary current thereof, the more negative the output voltage of rectifying-smoothing circuit RS, hence transistor Q15 diverts less current from the charge current of capacitor C5 and consequently the latter capacitor C5 is charged more rapidly, i.e., monostable circuit Q6/Q7 switches back to its normal condition more quickly.

It is now readily seen, that the positive going transitions of the square wave appearing at the output p of pulse width modulator PWM occur together with the transitions of the multivibrator square wave output, but the instants of occurrence of the negative going transitions thereof are controlled by the error amplifier EA.

Transistor Q5 of phase inverter I2 forming part of the forementioned third feedback loop, is switched ON and OFF together with power transistor Q2. When transistor Q5 is switched ON its collector is at the ground potential, whereas when it is switched OFF its collector is at a negative potential. Bistate circuit Q3/Q4 of driver stage DR1 is in its normal condition; transistor Q3 ON and transistor Q4 OFF, if none of transistors Q10, Q6 and Q5 is ON, i.e., if their collectors are at the negative potential of source E1; it is in its reverse condition; transistor Q3 OFF and transistor Q4 ON, if any of the transistors Q10, Q6, and Q5 is ON. When transistor Q4 is switched ON and transistor Q3 OFF their collectors are at the negative potential of source E1 and the ground potential respectively. The primary current of driving transformer DT1 then circulates from ground to source E1 via the right half of primary winding thereof, resistor R3 and collector-emitter junction of transistor Q4. The voltage thus induced in the secondary winding of transformer DT1 switches power transistor Q1 OFF, since it reverse biases its emitter-base junction. When transistor Q4 is switched OFF and transistor Q3 ON, the primary current of transformer DT1 circulates from ground to source E1 via the left half of primary winding thereof, resistor R2 and collector-emitter junction of transistor Q3. The voltage now induced in the secondary winding of transformer DT1 switches transistor Q1 ON since it forward biases its emitter-base junction.

With the negative logic convention, i.e., signals of the more negative level (levelof source E1) are defined as "1" and calling $i2$ the output pulse waveform (not shown) of phase inverter I2, the pulses switching power transistor Q1 ON and OFF are given by the logical functions $pmi2$ and $\overline{p} + \overline{m} + \overline{i2}$ respectively.

It is evident that similar considerations apply to the driver stage DR2 and phase inverter I1, their circuitries (not shown) being identical to the circuitries of driver stage DR1 and phase inverter I2, so that the pulses switching power transistor Q2 ON and OFF are given by the logical functions $p\overline{mi}\,1$ and $\overline{p}+\overline{m}$ +i̅1, respectively; wherein i1 is the output pulse waveform (not shown) of phase inverter I1.

It is now readily seen, that the pulses pmi2 and p$\overline{mi}$1 switching ON power switches Q1 and Q2, have a length proportional to the length of pulses $m = 1$ and $\overline{m} = 1$ of astable multivibrator AM and consequently inversely proportional to the lengths of current pulses through switches Q1 and Q2, respectively. It is obvious, that the current pulses through the latter switches Q1 and Q2 will thus be rendered substantially equal to one another, so that the DC magnetizing current of power transformer PT will substantially be reduced to zero.

The role played by the threshold circuit TM may now easily be understood. This circuit TH constitutes a current limiting arrangement operating in the following way: When the common mode current of differential amplifier DA, which is proportional to the sum of the average value of the currents through power switches Q1 and Q2, increases beyond a predetermined value, the voltage at the common mode output c thereof becomes more positive than the voltage of reference source E2 and transistor Q14 is switched ON (saturated). Due to the switching ON of transistor Q14 a current path is established from ground to source E2 ($|E2| < |E1|$) via resistor R23 (33 Ohms), saturated transistor Q9, resistor R20 (1,000 Ohms), conductor h3, resistor R36 (220 Ohms) and saturated transistor Q15. The base of transistor Q8 is thus brought at the negative potential of source E2, hence, bistate circuit Q8/Q9 switches in the condition Q8 ON/Q9 OFF, capacitor C5 is discharged and monostable circuit Q6/Q7 switches in the condition Q6 ON/Q7 OFF. In this way, the output p of pulse width modulator PWM is brought at the logical 0-level, so that driver stages DR1 and DR2 are dirable from applying an actuating pulse to power switches Q1 and Q2. Transistor Q14 is maintained ON as long as the potential at the common mode output c of differential amplifier DA is more positive than the potential of source E2 the current path from ground to source E2 now being established via resistor R23, emitter-base junction of conductive transistor Q8, conductor h3, resistor R36 and transistor Q14.

It should finally be noted that the forementioned damping arrangement, constituted by resistor R1 in series with capacitor C2, is connected across the converter inputs for compensating the negative input impedance thereof, which otherwise could lead to low frequency pumping.

While the principles of the invention have been described above in connection with specific apparatus, it is to be clearly understood that this description is made only by way of example and not as a limitation on the scope of the invention.

I claim:

1. An improved chopper circuit for converting the voltage from an input DC source into an alternating output voltage including an output transformer with at least one primary winding whose ends are coupled to one pole of said DC source via first and second switching devices respectively, the other pole of said DC source being coupled to a mid-tapping of said primary winding, control signal generating means providing first and second phase pulse sequences and coupling means to respectively apply said first and said second phase pulse sequences to said first and said second switching devices to alternately switch them ON and OFF one at a time, wherein the improvement comprises:

a second transformer whose primary winding is in series with one of said first and second switching devices;

first and second peak rectifying means coupled to a corresponding secondary winding of said second transformer to produce first and second signals respectively;

a square wave multivibrator normally providing a balanced square wave output;

a differential amplifier to compare the amplitude of said first signals with the amplitude of said second signals and provide in response thereto an output signal proportional to the differences of the two signals;

means to apply said output signal to said multivibrator to modify the pulse widths of said first and second pulse sequences so that the current pulse widths through said first and second switching devices are maintained substantially equal to one another.

2. A chopper circuit according to claim 1 further including first and second inhibiting means each coupled between said one and said other end of the primary winding of said output transformer and one of said second and first switching device to inhibit the application of an actuating control pulse to one of said second and first switching device when other of said first and second switching device is still switched ON.

* * * * *